US006934964B1

(12) United States Patent
Schaffer et al.

(10) Patent No.: US 6,934,964 B1
(45) Date of Patent: Aug. 23, 2005

(54) ELECTRONIC PROGRAM GUIDE VIEWING HISTORY GENERATOR METHOD AND SYSTEM

(75) Inventors: J. David Schaffer, Wappingers Falls, NY (US); Kwok Pun Lee, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/500,307

(22) Filed: Feb. 8, 2000

(51) Int. Cl.[7] .......................... G06F 3/00; G06F 13/00; H04N 5/445

(52) U.S. Cl. .......................................... 725/46; 725/47

(58) Field of Search ............... 725/39–47; G06F 3/00, G06F 13/00; H04N 5/445

(56) References Cited

U.S. PATENT DOCUMENTS

| | | | | |
|---|---|---|---|---|
| 5,223,924 A | * | 6/1993 | Strubbe | 725/46 |
| 5,465,113 A | * | 11/1995 | Gilboy | 725/29 |
| 5,483,278 A | * | 1/1996 | Strubbe et al. | 725/61 |
| 5,689,663 A | | 11/1997 | Williams | 395/327 |
| 5,751,282 A | * | 5/1998 | Girard et al. | 345/721 |
| 5,798,785 A | * | 8/1998 | Hendricks et al. | 725/46 |
| 5,945,988 A | * | 8/1999 | Williams et al. | 345/747 |
| 5,959,688 A | * | 9/1999 | Schein et al. | 725/49 |

FOREIGN PATENT DOCUMENTS

| | | | |
|---|---|---|---|
| EP | 0854645 | 7/1998 | H04N 5/445 |
| WO | WO9749242 | 12/1997 | H04N 7/10 |
| WO | WO9825884 | 6/1998 | |
| WO | WO9918722 | 4/1999 | H04N 5/445 |
| WO | WO9920008 | 4/1999 | H04N 1/02 |
| WO | WO9925119 | 5/1999 | H04N 5/445 |
| WO | 0004708 A1 | 1/2000 | |

* cited by examiner

*Primary Examiner*—Vivek Srivastava

(57) ABSTRACT

An electronic programming guide (EPG) system employs a preference engine and processing system that learns viewers' television watching preferences by monitoring their viewing patterns. The system operates transparently to build a profile of a viewer's tastes. The profile is used to provide services, for example, recommending or automatically recording television programs the viewer might be interested in watching. To permit the personalization of the preferences database, a user interface is provided to allow the user to simulate various kinds of interaction with the system. This allows the system to build a profile rapidly without requiring a long interaction history to personalize the system.

31 Claims, 8 Drawing Sheets

ELECTRONIC PROGRAM GUIDE VIEWING HISTORY GENERATOR METHOD AND SYSTEM

BACKGROUND OF THE INVENTION

The present invention relates to systems that employ electronic program guides (EPGs) to assist media users in managing a large number of media-content choices, for example, television programming chatrooms, on-demand video media files, audio, etc. More specifically, the invention relates to such systems that provide "intelligence", such as an ability to suggest choices and an ability to take actions, for example to record a program, on the user's behalf based on the user's preferences.

A common element among conventional Electronic Program Guide (EPG) systems is their ability to display listings of programs for many available channels. The listings may be generated locally and displayed interactively. The listings are commonly arranged in a grid, with each row representing a particular broadcast or cable channel, such as ABC, PBS, or ESPN and each column of the grid representing a particular time slot, such as 4:00 p.m. to 4:30 p.m. Multiple rows and multiple columns can be displayed on the screen simultaneously. The various scheduled programs or shows are arranged within the rows and columns, indicating the channels and times at which they can be found. The grid can be scrolled vertically so that a viewer can scan through different channels within a given interval of time. The grid may also be scrolled horizontally (panned) to change the time interval displayed.

Data regarding available programs may be received by a cable system or telephone line as a set of data records. Each available program may have a single corresponding data record containing information about the program such as its channel, its starting and ending times, its title, names of starring actors, whether closed-captioning and stereo are available, and perhaps a brief description of the program. It is not difficult to format a grid such as described above from this type of data records. The data spanning a period (e.g., two weeks) is typically formatted once at the server (e.g., the cable system's head-end) and broadcast repeatedly and continuously to the homes served by the cable system. Alternatively, the data may be downloaded via phone line, or other network, either on-demand or on a predetermined schedule.

An EPG system can run on a device with a user interface (hereinafter a "user interface device"), which can be a set-top box (STB), a general purpose computer, an embedded system, a controller within the television, or the server of a communications network or Internet server. The user interface device is connected to the TV to generate displays and receive input from the user. When scrolling to a new column or row, the user interface device may retrieve appropriate information from a stored database (in the user interface device or elsewhere) regarding the programming information that needs to be presented for the new row or column. For instance, when scrolling to a new column, programs falling within a new time slot need to be displayed.

In a world with too many media choices electronic program guides (EPGs) promise to make television and other media viewing manageable. Their real potential in managing large numbers of choices is in interactive "smart" systems. An interactive application of EPGs builds a user-preference database and uses the preference data to make suggestions, filter current or future programming information to simplify the job of choosing, or even make choices on behalf of the user. For example, the system could record a program without a specific request from the user.

A first type of device for building the preference database is a passive one from the standpoint of the user. The user merely makes choices in the normal fashion from raw EPG data and the system gradually builds a personal preference database by extracting a model of the user's behavior from the choices. It then uses the model to make predictions about what the user would prefer to watch in the future. This extraction process can follow simple algorithms, such as identifying apparent favorites by detecting repeated requests for the same item, or it can be a sophisticated machine-learning process such as a decision-tree technique with a large number of inputs (degrees of freedom). Such models, generally speaking, look for patterns in the user's interaction behavior (i.e., interaction with the UI for making selections).

A second type of device is more active. It permits the user to specify likes or dislikes. For example, the user can indicate, through a user interface, that dramas and action movies are favored and that certain actors are disfavored. These criteria can then be applied to predict which from among a set of programs would be preferred by the user.

An example of the first type is MbTV, a system that learns viewers' television watching preferences by monitoring their viewing patterns. MbTV operates transparently and builds a profile of a viewer's tastes. This profile is used to provide services, for example, recommending television programs the viewer might be interested in watching. MbTV learns about each of its viewer's tastes and uses what it learns to recommend upcoming programs. MbTV can help viewers schedule their television watching time by alerting them to desirable upcoming programs, and with the addition of a storage device, automatically record these programs when the viewer is absent.

MbTV has a Preference Determination Engine and a Storage Management Engine. These are used to facilitate time-shifted television. MbTV can automatically record, rather than simply suggest, desirable programming. MbTV's Storage Management Engine tries to insure that the storage device has the optimal contents. This process involves tracking which recorded programs have been viewed (completely or partially), and which are ignored. Viewers can "lock" recorded programs for future viewing in order to prevent deletion. The ways in which viewers handle program suggestions or recorded content provides additional feedback to MbTV's preference engine which uses this information to refine future decisions.

MbTV will reserve a portion of the recording space to represent each "constituent interest." These "interests" may translate into different family members or could represent different taste categories. Though MbTV does not require user intervention, it is customizable by those that want to fine-tune its capabilities. Viewers can influence the "storage budget" for different types of programs. For example, a viewer might indicate that, though the children watch the majority of television in a household, no more than 25% of the recording space should be consumed by children's programs.

As an example of the second type of system, one EP application (EP 0854645A2) describes a system that enables a user to enter generic preferences such as a preferred program category, for example, sitcom, dramatic series, old movies, etc. The application also describes preference templates in which preference profiles can be selected, for example, one for children aged 10–12, another for teenage girls, another for airplane hobbyists, etc. This method of inputting requires that a user have the capacity to make generalizations about him/herself and that these be a true picture of his/her preferences. It can also be a difficult task for common people to answer questions about abstractions such as: "Do you like dramas or action movies?"

A PCT application (WO 97/49242 entitled System and Method for Using Television Schedule Information) is another example of the second type. It describes a system in which a user can navigate through an electronic program guide displayed in the usual grid fashion and select various programs. At each point, he may be doing any of various described tasks, including, selecting a program for recording or viewing, scheduling a reminder to watch a program, and selecting a program to designate as a favorite. Designating a program as a favorite is for the purpose, presumably, to implement a fixed rule such as: "Always display the option of watching this show" or to implement a recurring reminder. The purpose of designating favorites is not clearly described in the application. However, more importantly, for purposes of creating a preference database, when the user selects a program to designate as a favorite, she/he may be provided with the option of indicating the reason it is a favorite. The reason is indicated in the same fashion as other explicit criteria: by defining generic preferences. The only difference between this type of entry and that of other systems that rely on explicit criteria, is when the criteria are entered.

The first type of system has the advantage of being easier on the user since the user does not have to provide any explicit data. The user need merely interact with the system. For any of the various machine-learning or predictive methods to be effective, a substantial history of interaction must be available to build a useful preference database. As a result, it can take a very long time before systems of the first type can begin to perform effectively (as compared to systems of the second type). Note that the machine-learning method associated with both types of systems can be any of a variety currently known or yet to be developed, for example, decision-tree, neural network, rule-induction, nearest neighbor, or genetic algorithm techniques.

SUMMARY OF THE INVENTION

Briefly, an electronic programming guide (EPG) system employs a preference engine and processing system that learns viewers' television watching preferences by monitoring their viewing patterns. The system operates transparently to build a profile of a viewer's tastes. The profile is used to provide services, for example, recommending or automatically recording television programs that the viewer might be interested in watching. To permit the personalization of the preferences database, a user interface is provided to allow the user to simulate various kinds of interaction with the system. This allows the system to build a profile rapidly without requiring a long interaction history in real time over a number of weeks or even months to personalize the system. The invention provides a preference-data building system that permits a user to enter preference data by interacting with a user interface ("UI") to select a favored program as if the user were selecting programs for use. In this way, the user is able to build the interaction history quickly.

To permit the entry of this "synthetic" or "simulated" interaction history, a user interface is generated and used to permit many content selections to be made in a short period of time. Fast review and selection are possible because the interaction is intended to supply preference information rather than to make actual viewing (recording, channel-blocking, etc.) selections.

In one embodiment, the UI uses old program lineups to generate an EPG display in any practical format, for example the time/channel grid format described in the background section. The system presents the user with the option of specifying programs that the user would watch, record for later viewing, lock with parental controls, etc. The categories can be further narrowed by such criteria as time of day for viewing (so the user would specify programs that would be viewed in the evening as opposed to during the day), weekday or weekend/holiday, or other indirect information. Once the kind of decision being simulated is specified, the user selects programs from the listing. In this way, the system simulates actual use of the system. The system can obtain this simulated interaction behavior in raw form and either save it in raw form or reduce it in some way for incorporation in the preference database depending on designer preferences and the type of user-modeling method being employed.

In another embodiment, the user simply selects from the EPG those programs that are preferred leaving disfavored programs unselected. Alternatively, the user can mark programs as liked and disliked. For example, using a handheld remote control, the user can use scrolling or skipping buttons, such as arrow keys, and indicate preferences with designated "Like" and "Dislike" keys. The user could make more narrow designations such as those considered as desirable for recording, desirable to block from access by children, etc.

Instead of using the grid format, a list may be generated from which redundant choices have already been deleted. The display of the list can be grouped to facilitate comprehension, for example, categories such as evening sitcoms, daytime soaps, etc. This allows intercomparison of items with common characteristics.

The content and grouping of the list may be determined in response to the user interaction. Information in the preference database may be used to help resolve ambiguities in the preference model it contains. For example, if the user likes some daytime soaps and not others, the particular features of the soaps can be resolved more clearly by providing a lot of soaps from which to select. If the user dislikes every soap presented, finer distinctions may not provide useful data and additional soaps would be culled from a candidate list of all possible programs. For another example, if the user appears to like science documentaries, more examples in the list would help the machine-learning system determine whether, for example, technology subject matter was favored over programs about nature and wildlife.

The inventive method of generating preference data has benefits over the criteria-based method of the second type. For one thing, the user may have very clear ideas about what the user likes and dislikes, but not a clear understanding of why. The invention takes advantage of what is revealed by people's raw reactions to choices to provide more accurate input to a predictive model (predictive of future likes and dislikes) than relying on the user's understanding of what the user likes or dislikes about something. Another benefit of specifying preference information in the form of simple likes and dislikes is that it may be less mentally taxing. The user's reaction to a choice of particular programs may be much faster, as well as more accurate, than abstract generalizations about likes and dislikes. Note that preference data may be specified in the form of a ranking of how much a user likes a particular program, for example, on a scale of 1 to 10.

In another embodiment, the invention accepts preferred program data from a source such as a portable memory card. The memory card is loaded with personal data that generally describes user preferences in various environments such as restaurants, computer software, movies, television shows, etc. The relevant information is extracted from the memory card and used to build or augment the preference database. The preference data stored on the memory card may be in the form of rules or criteria such as used in the second type of preference data building devices rather than program selections. These criteria-based data may be combined with the program-preference data in various ways. Two sets of weights may be applied successively to the same set of available program data, one from the program preference data and one from the criteria data. Alternatively, if the machine-learning device used for the first type data generates rules, the second-type criteria can be lumped together with these rules and applied for filtering available programming.

In another feature of the invention, programs can be marked as "Unknown" as well as "Liked" or "Disliked." Alternatively, programs not marked can be assumed to be unknown. In such cases, this information can be used to strengthen the user profile according to the particular machine-learning device employed.

Embodiments may be a program-display system that works with an EPG system, receives input from the use ("interaction") with one system, and measures the viewer interaction behavior. In other words, an EPG that "observes" viewer behavior and attempts to use the past viewer behavior to make the system's output more intelligent, such as by recording things the viewer does not explicitly request. To perform this function, the inventive system may have a preference data store to hold data relating to the interaction behavior. The data store could be any type of memory or storage device such as a hard disk, a server, optical drive, smart card, etc. The system also may use a schedule data store to hold program schedule data and a controller programmed to generate predictions about what the user would have done with the system had the user interacted with it. For example, the user might be away at a time a program is available for recording. In such a case, the system could record the program for the user. Also, the system can screen out material that is not likely to interest the user. To do these things, the preference engine controls a channel through which content is transmitted to an output device (be it a monitor or a recording device such as a VCR or hard disk), responsively to the preference data and current schedule.

If the user is available to make selections, the preference engine may display a list of recommended programs responsively to the predictions and the schedule data, and accept input indicating a program to be viewed now or recorded for later use. The controller is also programmed to display a list of available programs and accept input indicative of multiple favored and/or disfavored program items to help teach the system. The material does not have to be categorized and the user does not have to be concerned with the rules by which programs will be ranked by the system. The user only has to inform the system by interacting with it. The display is used for a simulated interaction, so the benefit of multiple selections can be provided in a single session. Also, the session can use old program listings. Thus, the controller is programmed to add to the preference store data that is responsive to the input without controlling a media output device to output the program. Thus, the preference data store can be loaded with new preference data without using (viewing, recording, downloading, down-sampling or otherwise transforming, redirecting, storing, interacting with as in a chat room, etc.) the programs identified.

The controller may also be programmed to generate the preference data from the user input directly, by employing a machine-learning method based on a discovery of patterns in the user input. The pattern-discovery technique may include decision-tree, neural network, rule-induction, nearest neighbor, and genetic algorithm technique, or other techniques. The latter are examples and are not intended to be limiting. The particulars involved in machine learning systems is beyond the scope of this specification, but persons of skill, given the teachings of this specification, would understand how to apply such techniques, including as-yet-unknown techniques, to the invention.

In embodiments, the invention may provide for adding preference data to an EPG system that stores prior program selections where the system has a program database containing a list of stored program identifiers identifying programs whose content is not currently, or scheduled to be, available for use. The prior program selection may be stored, or some distillation of the data may be stored. For example, to use this data to load the preference database, it might be considered immaterial what time the program had been scheduled to air. The stored "old" programs are used for training the preference part of the system and not to control output or recording of a program. A user-interface element displays the identifiers of programs and accepts user input. The user input can be single or multiple selections. The multiple selections could mean making more than one selection at the same time.

In a variation of the invention, the EPG system stores clips from various content items. In this way, a user can rely on more than just the description and title of the program to decide how and if the user would use the program or content. Interacting with the UI could be like simulated channel surfing. Alternatively, the user could just request a clip when the additional information is desired. Clips could be a sample of the content from the particular media item. For example, if the media item is a chat room, the sample could be a ten-minute chat sample, which could be compressed, if all text. If the content were video, it could be time compressed or down-sampled. If it is a television program, the clip could be a video clip. Note that the clips need not be sampled at full bandwidth. Also, thumbnail clips could be used or the clips could be displayed as frame-grabs on a thumbnail display. The display could be pruned according to techniques discussed elsewhere in the specification, particularly in connection with FIG. 11.

The media content available may be deliverable through any kind of channel through which media is transmitted (e.g., computer network or Internet, radio signals, broadcast, multicast, dialup). A controller may be connectable to the communications channel to control delivery of the media content through the communications channel responsively to the preference data. The preferences-training feature may be implemented by insuring the controller is programmed to generate UIs just for generating preference data and regular UIs, for using the media content and secondarily generating preference data, and to supply data to the preference store from interactions with both. When displaying the regular UIs redundant entries would not be eliminated so that, for example, both occurrences of a movie airing at different times would be displayed. When displaying the UIs just for purposes of generating preference data, the redundancies can be screened out. The preference-generating UIs can be displayed as lists, thumbnails, etc. The thumbnails can be updated from the last instantiation of the media item. The controller may be programmed to accept commands to limit the identification data displayed for generating preference data. This can be done prior to the simulated interaction or automatically using the preference data as the simulated interaction proceeds. The commands to limit may include a command to omit representation in the identification data set of one or another of the predefined classes of media content. For example, the user could indicate, so to speak, "don't bother showing me any nature programs." In this way, material in such classes would not be displayed in the list of items from which to pick. Commands may also be accepted to emphasize certain kinds of media content. So, for example, if a user frequently uses content corresponding to a certain class, finer preference distinctions could be made if a large sample from that class were scrutinized by the user and the preferences fed to the machine-learning algorithm.

In some embodiments, the invention can be described in terms of a method of updating the preference database. The steps may be as follows:

1. generate a first list of programs currently available for viewing, so that redundant entries are permitted when the entries are distinguishable only by a time of broadcast,
2. at a time of viewing, display the first list of programs, accept commands to select at least one program from the list, and control a media output device to display it,
3. generate a second list of programs scheduled to be available currently and in the future and exclude redundant entries when the redundant entries are distinguishable only by time of broadcast,
4. at a time of programming, display the second list of programs and accept commands to select multiple programs from the second list and store the multiple selections, and
5. modify the preference database responsively to the multiple selections thereby stored.

An alternative description of steps under an embodiment may include displaying a list of program categories, and accepting commands referencing the program categories; generating a list of programs scheduled to be available currently and in the future and that have been available in the past, and excluding from the list redundant entries when the redundant entries are distinguishable only by time of broadcast. Thus, the system would not eliminate, from the list, two airings of the same movie or successive episodes of the same show. The method also includes the step of modifying the list responsively to the commands referencing the program categories. At a time of programming the method may add the steps of displaying the second list of programs, accepting commands to select multiple programs from the second list, storing the multiple selections, and modifying the preference database responsively to the multiple selections without controlling an output of any of the programs identified in the multiple selections. The step of accepting commands referencing the program categories may include the step of accepting a command to emphasize programs in a selected category in some way. The step of modifying the list in that case may include increasing representation in the list of programs in the selected category as discussed above.

Variations of the method include modifying the step of generating a second list by including a step of generating a list of programs that were scheduled to be available in the past. The step of generating a second list may include displaying a list of program categories, accepting commands referencing the program categories, and excluding programs scheduled to be available currently and in the future in response to the commands referencing the program categories. The step of generating a second list may include displaying a list of program categories, accepting commands referencing the program categories, and excluding programs scheduled to be available currently and in the future (responsively to the commands referencing the program categories).

The invention will be described in connection with certain preferred embodiments, with reference to the following illustrative figures so that it may be more fully understood.

With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
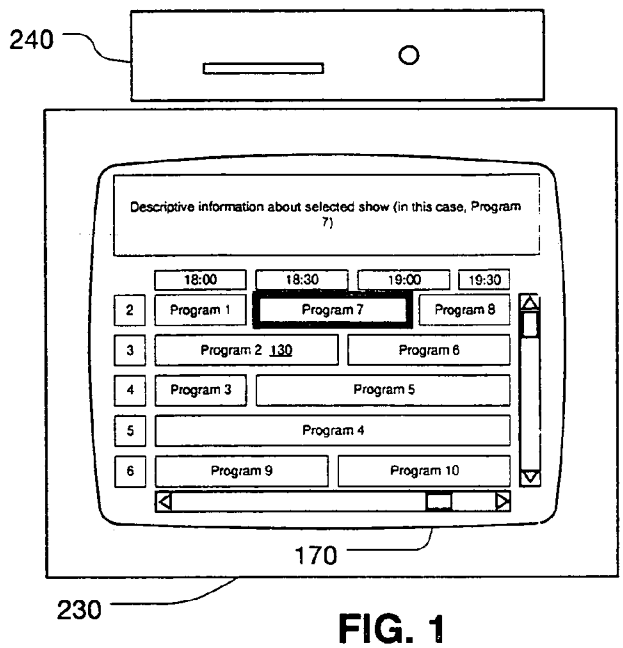
FIG. 1 shows a television/monitor displaying an EPG, with a computer to generate the EPG display, and an interaction interface suitable for use with embodiments of the invention.
Figure 2:
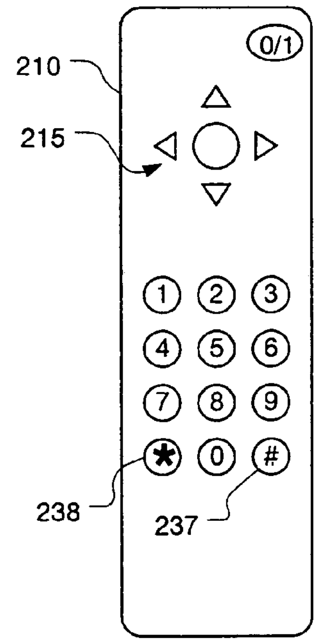
FIG. 2 shows a remote control suitable for use with UI embodiments of the invention.
Figure 3:
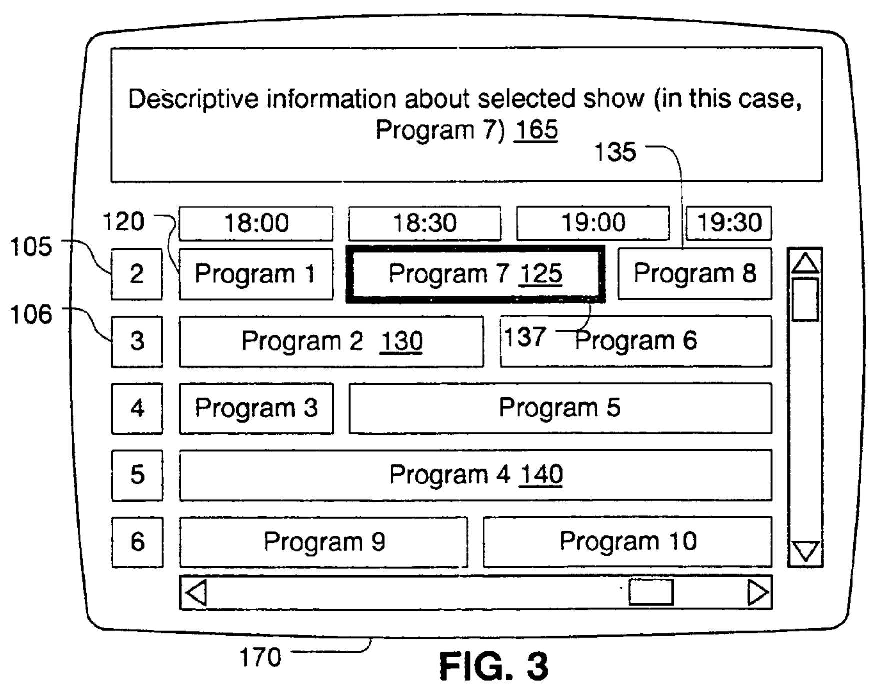
FIG. 3 shows an EPG display suitable for use with UI embodiments of the invention.

Referring to FIGS. 1–4 the invention relates to the environment of electronic program guides (EPGs). In the context of televisions, EPG is applied loosely to various features that can be delivered using a database of program information. The program information may include titles and various descriptive information such as a narrative summary, various keywords categorizing the content, etc. In an embodiment, a computer sends program information to a television 230. Referring now also to FIGS. 2 and 3, the program information can be shown to the user in the form of a time-grid display 170 similar to the format commonly used for existing cable television channel guides. In the time-grid display 170, various programs are shown such as indicated by bars at 120, 125, 130, 135, and 140. The length of each bar (120–140) indicates a respective program's duration and the start and end points of each bar indicate the start and end times, respectively, of each respective program. A description window 165 provides detailed information about a currently selected program. The currently selected program, Program 7 at 125, is indicated by, for example, highlighting a colored border 137 around the currently selected program item. Various devices may be used to select programs, such as cursor keys 215 on remote control 210.

Figure 4:
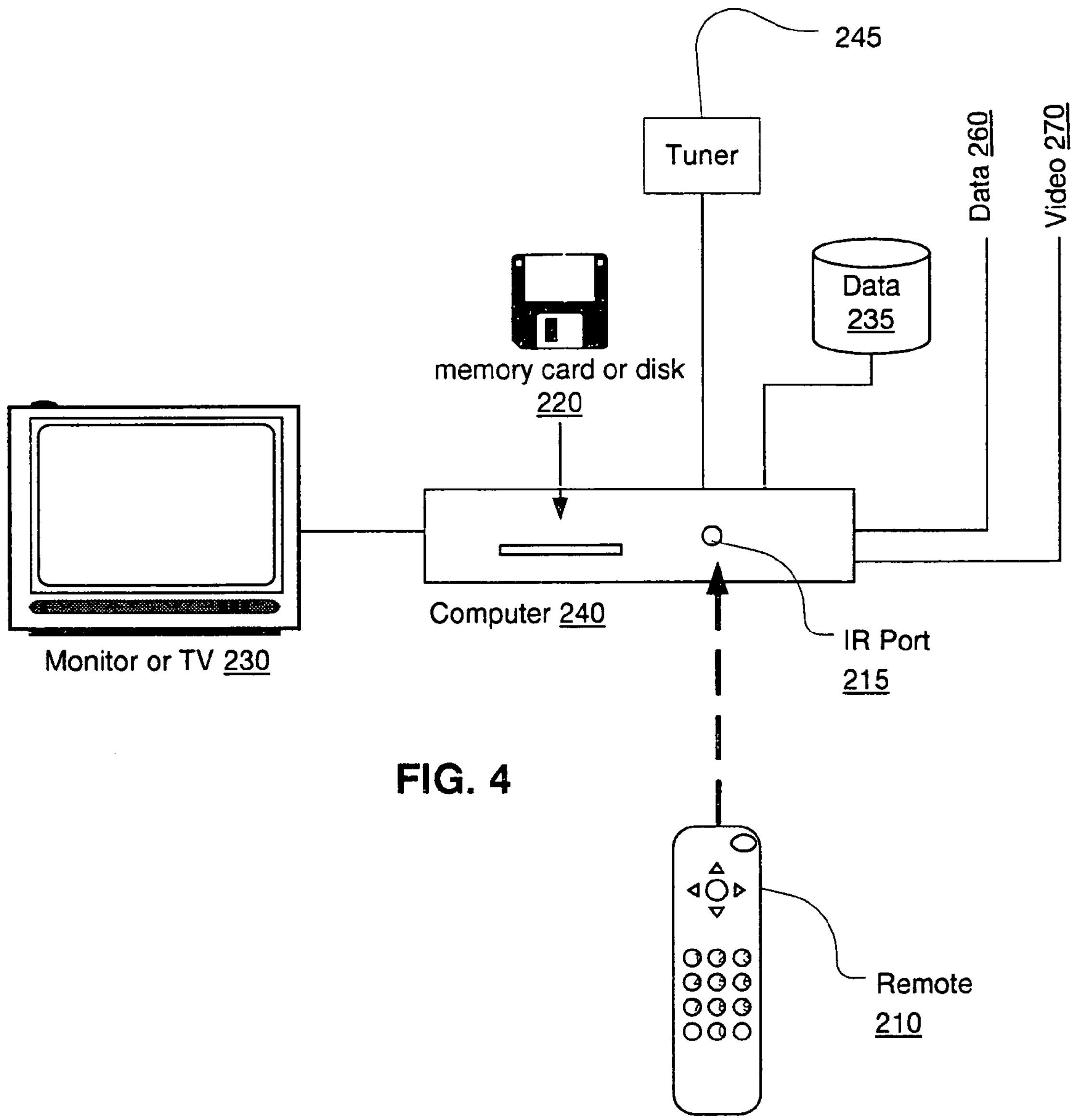
FIG. 4 shows a layout of physical components through which various embodiments of the invention may be realized.

Referring now also to FIG. 4, the computer 240 may be equipped to receive the video signal 270 and control the channel-changing function, and to allow a user to select channels through a tuner 245 linked to the computer 240 rather than through the television's tuner 230. The user can then select the program to be viewed by highlighting a desired selection from the displayed program schedule using the remote control 210 to control the computer. The computer 240 has a data link 260 through which it can receive updated program schedule data. This could be a telephone line connectable to an Internet service provider or some other suitable data connection. The computer 240 has a mass storage device 235, for example a hard disk, to store program schedule information, program applications and upgrades, and other information. Information about the user's preferences and other data can be uploaded into the computer 240 via removable media such as a memory card or disk 220. A great many interesting features are enabled by appropriately programming the computer 240.

Note that many substitutions are possible in the above example hardware environment and all can be used in connection with the invention. The mass storage can be replaced by volatile memory or non-volatile memory. The data can be stored locally or remotely. In fact, the entire computer 240 could be replaced with a server operating offsite through a link. Rather than using a remote control to send commands to the computer 240 through an infrared port 215, the controller could send commands through a data channel 260 which could be separate from, or the same as, the physical channel carrying the video. The video 270 or other content can be carried by a cable, RF, or any other broadband physical channel or obtained from a mass storage or removable storage medium. It could be carried by a switched physical channel such as a phone line or a virtually switched channel such as ATM or other network suitable for synchronous data communication. Content could be asynchronous and tolerant of dropouts so that present-day IP networks could be used. Further, the content of the line through which programming content is received could be audio, chat conversation data, web sites, or any other kind of content for which a variety of selections are possible. The program guide data can be received through channels other than the separate data link 260. For example, program guide information can be received through the same physical channel as the video or other content. It could even be provided through removable data storage media such as memory card or disk 220. The remote control 210 can be replaced by a keyboard, voice command interface, 3D-mouse, joystick, or any other suitable input device. Selections can be made by moving a highlighting indicator, identifying a selection symbolically (e.g., by a name or number), or making selections in batch form through a data transmission or via removable media. In the latter case, one or more selections may be stored in some form and transmitted to the computer 240, bypassing the display 170 altogether. For example, batch data could come from a portable storage device (e.g. a personal digital assistant, memory card, or smart card). Such a device could have many preferences stored on it for use in various environments so as to customize the computer equipment to be used.

Figure 5:
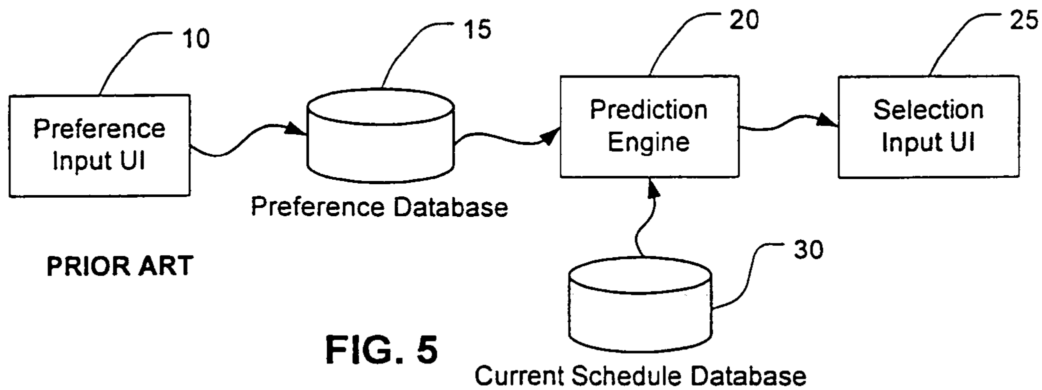
FIG. 5 illustrates the flow of data in a prior art second type system in which criteria for selection of programs are specified and incorporated in a preference database and used to select programs.

Referring now to FIG. 5 a prior art implementation of EPG generates a display and accepts user input. This system is of second type described in the background section. In combination, the display and the mechanism that permits data to be entered are referred to as a user interface or "UI," in this case, a preference input UI 10. The display shows various criteria for the user to select. These criteria correspond to characterizations of the different content that can be selected. For example, the user might be presented with such characterizations as "sports," "cartoons," "action movies," and "handyman shows." The user may select those that characterize the content the user prefers to use (by "use" it is meant such activities as: record, download, view, block from viewing by children, down-sample, route to another location, interact with such as in interacting with a chat site or Java program, or otherwise access in some way, etc.). More narrow criteria can also be specified, for example, particular programs that are favorites could be identified. This information is stored, at a time of selection of preferences, in a preference database 15. At a later time, when the content is desired to be selected for use, these stored preferences are used to predict what choices in a current schedule database 30 the user would be likely to (or possibly, depending on the degree of scrutiny) want to use. A prediction engine 20 uses the contents of the preference database 15 and the contents of the current schedule database 20 to modify the display of currently available content selected through a selection input UI 25. That is, the selection input UI 25 shows a currently available list of content (displayed, for example as shown in FIG. 3) rendered according to the contents of the preference database 15.

Figure 6:
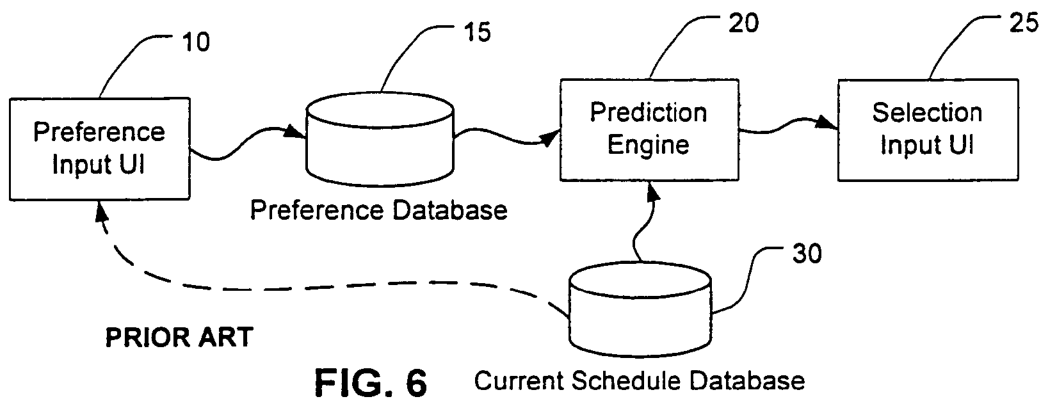
FIG. 6 illustrates the flow of data in a prior art second type system which differs from the system illustrated in FIG. 1 in that program schedules are used to prompt the user to specify selection criteria.

Referring now to FIG. 6, a prior art implementation of EPG also generates a display and accepts user input. This system also is of the second type described in the background section. The system of FIG. 6 is similar to that of FIG. 5 with the exception that criteria are not necessarily specified in a vacuum. That is, in one mode for the preference input UI 10, upon designation of a favorite, the user is presented with the option of designating the criterion according to which the content is preferred. That is, the user specifies why the content is a favorite. To do this, information may be drawn from the current schedule database 30 and displayed in a time-grid format similar to what is shown in FIG. 3. The user would select a program to watch, record, or designate as a favorite. At this time, the user would be presented with the option of giving a reason in the form of a selection from a list of characterizations pertinent to the movie. For example, the user could indicate that movies with a particular actor are favored. In other respects, the system of FIG. 6 is the same as that of FIG. 5.

Figure 7:
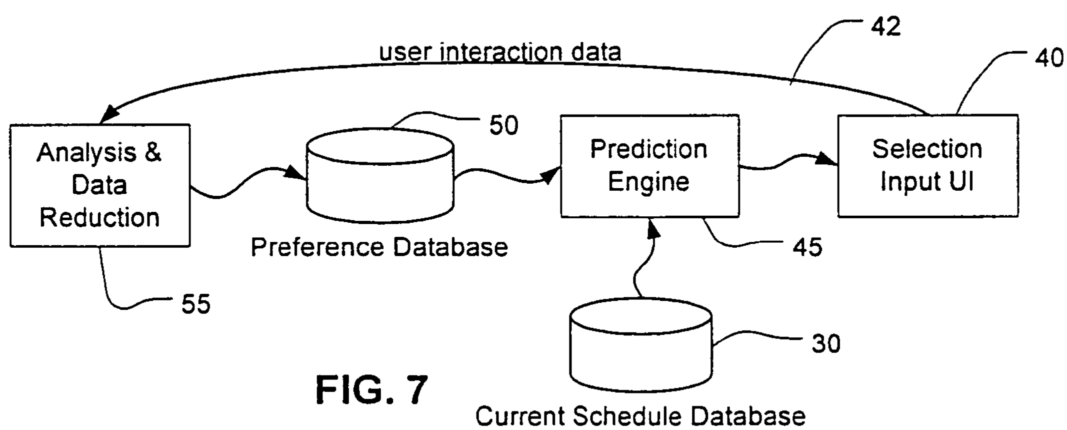
FIG. 7 illustrates the flow of data in a first type system in which the model for predicting favored programming is derived by some machine-learning system based on user interaction with the system.

Referring now to FIG. 7, another prior art implementation of an EPG also generates a display and accepts user input. This system, however, is of the first type described in the background section. The preference database 50, in this case, contains the definition of a prediction model that may or may not bear any resemblance to the criterion-based database of the second type prior art systems. The data with which the preference database 50 is loaded is a predictive model based on some automated analysis of the user's prior interaction with the system. Figuratively, the system "watches" what the user selects for use and tries to "learn" what the user prefers. There are a number of well-known "machine-learning" devices for achieving this kind of prediction process. For instance, the device described in U.S. patent application entitled "ADAPTIVE TV PROGRAM RECOMMENDER", Feb. 4, 2000, Ser. No. 09/498,271, and the device described in U.S. Pat. No. 6,727,914, entitled "METHOD AND APPARATUS FOR RECOMMENDING TELEVISION PROGRAMMING USING DECISION TREES", both commonly assigned to the assignee of this patent application and incorporated herein by reference. The user interacts with a selection input UI 40 which is in most respects like that of the prior two figures. However, the selection input UI 40 provides data for analysis and reduction by an analysis and data reduction device 55 (the latter step could be omitted and the data transmitted in raw form), which is then stored in a preference database 50. As the user interacts with the system, the preference database fills with increasing amounts of data. As a result, the prediction model becomes increasingly accurate. A prediction engine 45 uses the model stored in the preference database 50 and the current schedule database 30 to generate the selection input UI 40. The system of FIG. 7 is a passive system in that there is no UI element required to add data to the preference database (although, at least certain preferences, such as ergonomic features, and other generic environmental parameters will likely be stored through an active UI mode).

Figure 8:
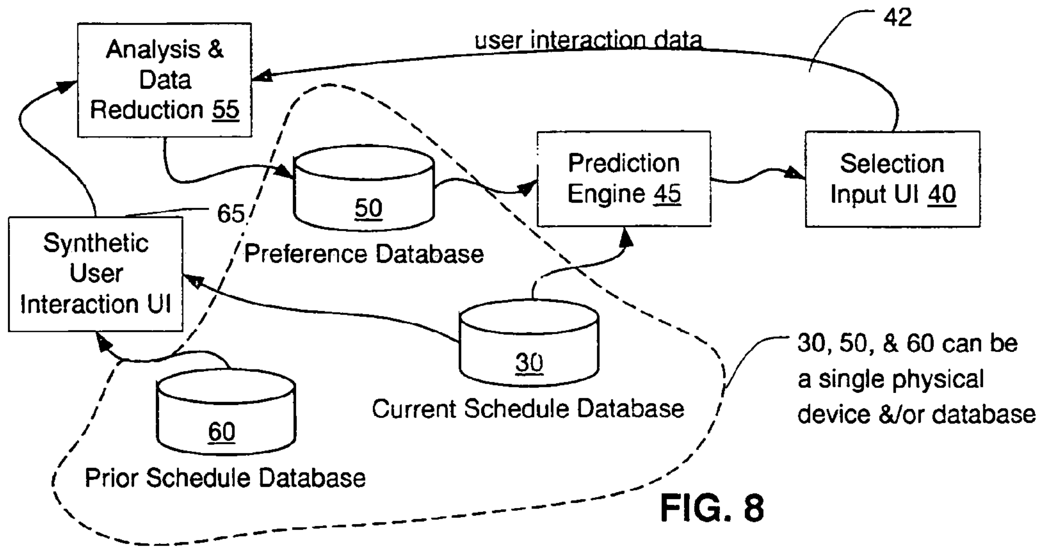
FIG. 8 illustrates the flow of data in a system according to an embodiment of the invention in which predictions are derived from a model generated from both user interaction and simulated user interaction with program guide data.

Referring to FIG. 8, an implementation of EPG according to an embodiment of the invention also generates a display and accepts user input. In one mode, this system is of the first type described in the background section. In this mode, the user interacts with the selection input UI 40 by selecting content desired to be used in some fashion and the system "observes" the interaction over time, building a database from which predictions can be made and used to customize the selection input UI 40 process. The embodiment of FIG. 8, however, permits the user to make selections to charge ("add data to", "load") the preference database 50 quickly for the purpose of creating a "selection history." In other words, the user simulates the interaction with the system that would occur upon normal use.

The user interacts with a selection input UI 40, which may be like that of the FIG. 7 embodiment. The selection input UI 40 provides data for analysis and reduction by an analysis and data reduction device 55, before the data is stored in a preference database 50. As in the FIG. 7 embodiment, as the user interacts with the system, the preference database 50 fills with increasing amounts of data. As a result, the prediction model stored in the preference database 50 becomes increasingly accurate. Again, the prediction engine 45 uses the model stored in the preference database 50 and the current schedule database 30 to generate the selection input UI 40.

In the embodiment of FIG. 8, a synthetic user interaction UI 65 element is generated to permit the user, at any time desired, to generate the equivalent of an interaction history. The synthetic user interaction UI 65 generates a selection display similar to that generated by the selection input UI 40. The display can be as shown in FIG. 3 or as a simple list. However, in this case, the user can make multiple indications of favored, disfavored, and unknown choices rapidly by scrolling through the display and making entries. In the embodiment of FIG. 8, the synthetic user interaction UI 65 is generated using content information from the current schedule database 30 and prior schedule database 60. Note that although they are depicted as separate devices, physically or logically, any or all of these databases can be subsumed within the same component or contained in a single database.

Figure 9:
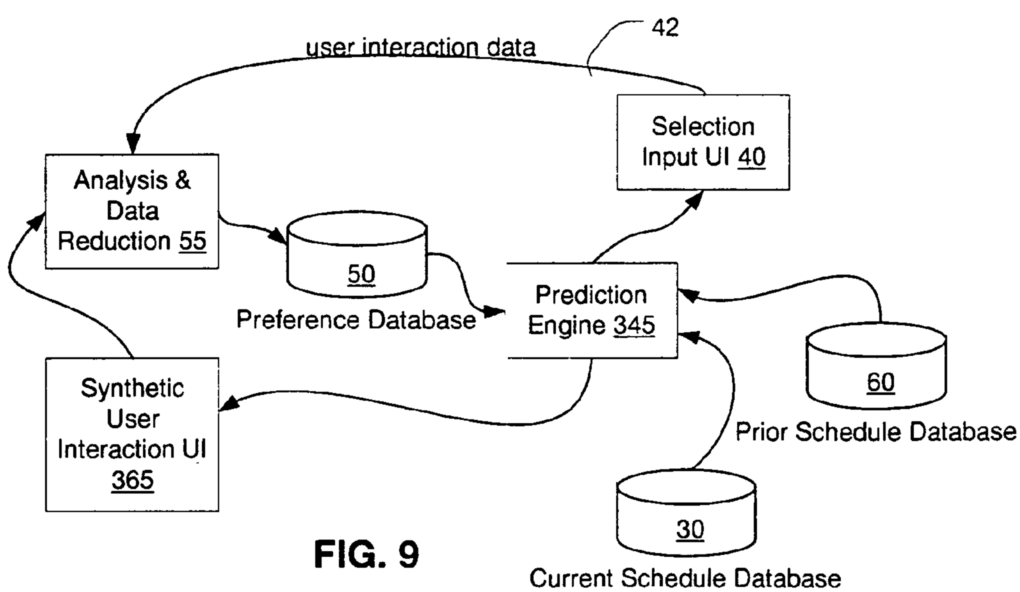
FIG. 9 illustrates the flow of data in a system according to another embodiment of the invention in which predictions are derived from a model generated from both user interaction and simulated user interaction with program guide data and the prediction engine is used to facilitate the active entry of selection data to build up the preference database.

Referring to FIG. 9, another embodiment of the invention employs a prediction engine 345 that supplies information to a synthetic user interaction UI 365. This embodiment is similar to that of FIG. 8 except that the display of content for selection by the synthetic user interaction UI 365 is controlled in response to information supplied by the prediction engine 345. When the user interacts with the synthetic user interaction UI 365, the choices selected for display may be altered based on error information supplied by the synthetic user interaction UI 365. Most machine-learning methods that may be employed in connection with the invention are capable of generating estimates of the reliability of predicted selections. Using an error estimate, the synthetic user interaction UI 365 may adjust the choices it displays to help refine areas of ambiguity in the prediction model.

Figure 8A:
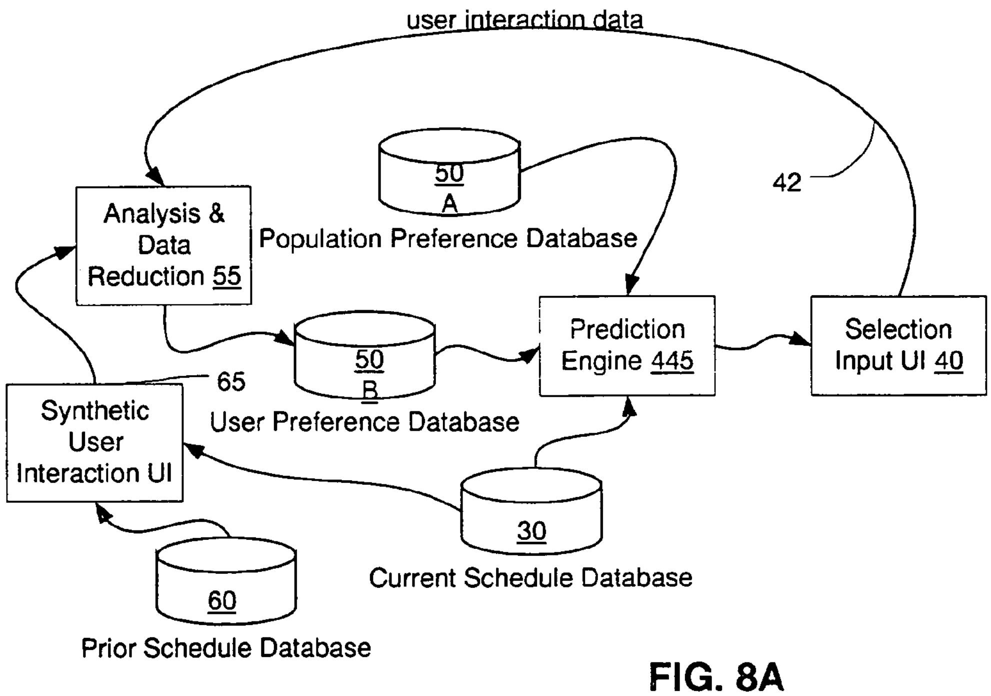
FIG. 8A illustrates the flow of data in a system in which population preference data is also used as in collaborative filtering systems.
Figure 9A:
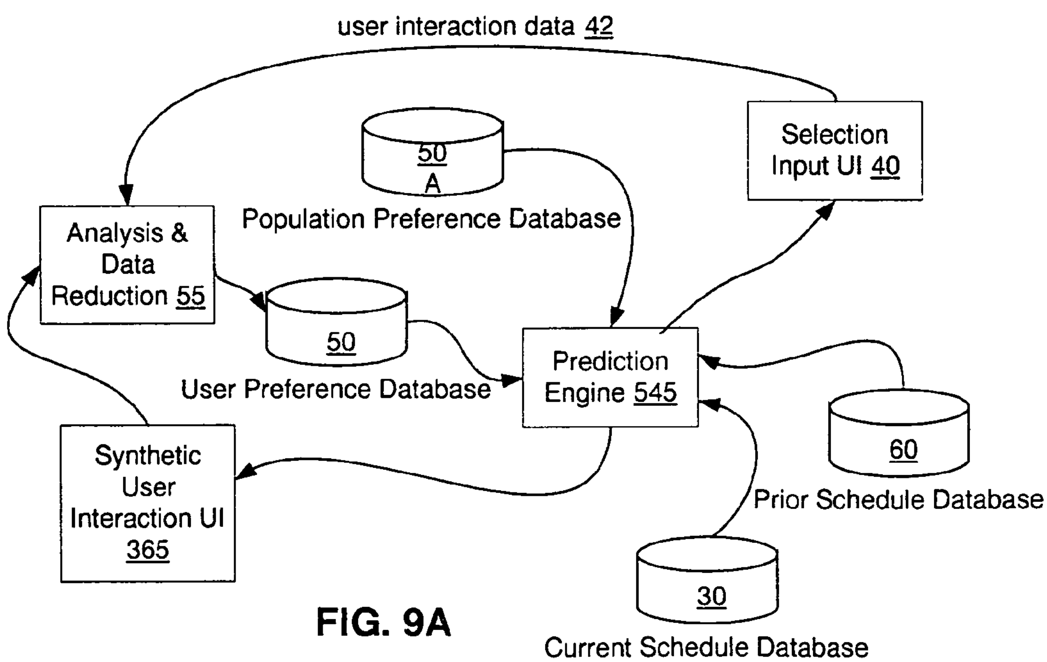
FIG. 9A is similar to FIG. 9, except that preference data comes from more than one source and is synthesized in a way that makes use of collaborative filtering techniques or some other manner of using both personal and public preference data to make predictions.

Referring to FIGS. 8A and 9A, the preference data employed by the prediction engine may include data from a user preference database 50B as well as a population preference database 50A. The user preference database 50B could be charged with data relating to one or more local users such as the members of a family. The population preference database 50A could be charged with data relating to a wider population. The totality of the preference data may be employed in a type of synthesis known as collaborative filtering by a prediction engine 445/545. Collaborative filtering is known in various fields for using patterns in the data relating to a large population to make predictions about individual behavior. For example, population data may show that individuals that prefer one kind of book also prefer a particular other kind of book. The same kind of technique may be employed in the environment of an EPG. Preferably, the population preference database 50A may be physically located in a separate location. Alternatively, model data derived from the population preference database 50A may be downloaded to the local equipment on a periodic basis.

A simple way to use error estimates to speed up the process of creating a valid prediction model is to provide more program selections for which predictions have a high error and fewer program selections for which predictions have a low error. It is appropriate to keep showing low error selections in case their high reliability is based on an unreliable pattern or rule (i.e., bad statistic). Another way to do this is for the prediction model to group a number of apparently favored or disfavored selections from either schedule database 30 or 60 which exhibit more than one basis of prediction. The synthetic user interaction UI 365 could, using this information, provide a larger number of selections from this set until one of the bases of prediction became substantially stronger. In this way, the preference database 50 can be built up in the areas where it is weak.

Figure 10:
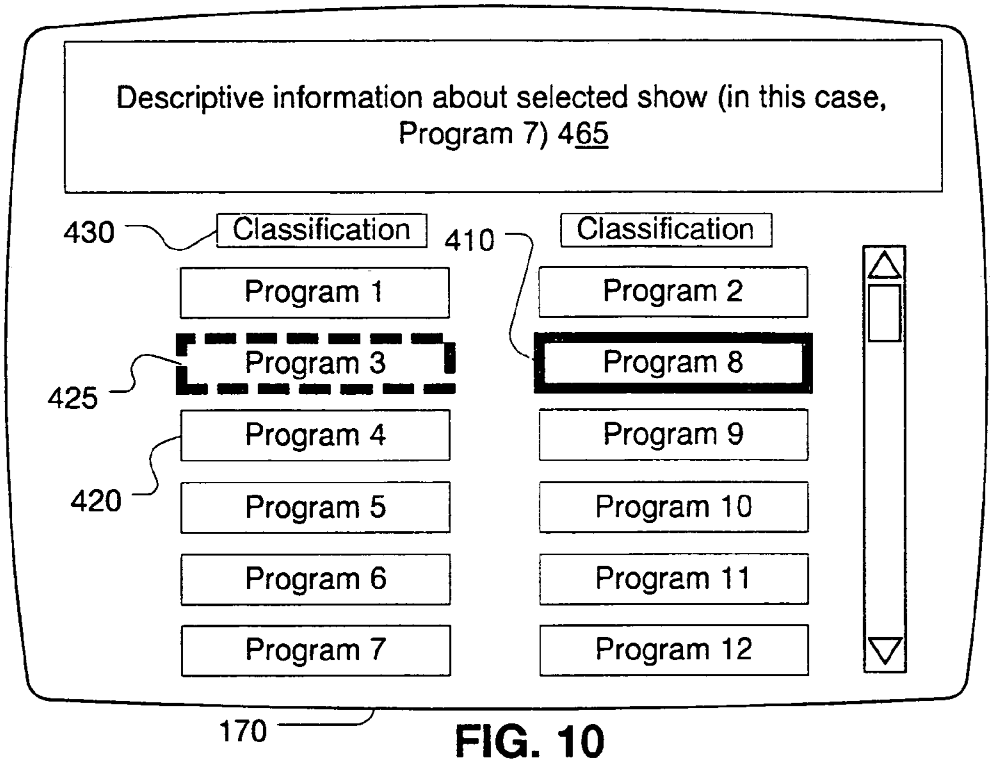
FIG. 10 illustrates a selection list format for making selections of programs or other media content that are favored or disfavored.

Referring now to FIG. 10, the synthetic user interaction UI 365 display can be a straight list of programs or other content displayed as a list rather than the typical time grid format. The list elements 420 can be derived from old schedules that are kept in the mass storage of the computer 240. With the stripping out of duplicates and other types of programming, via the interactive scheme described with reference to FIG. 9, a time-grid could end up being full of empty spaces. A large window 465 provides descriptive information about the particular program currently highlighted 410. Navigation may be by any suitable means as described with reference to FIGS. 1–3. When a program is highlighted, the user can indicate, using designated keys, whether the program is favored or disfavored. For example this could be done using the "#" 237 and "*" 238 keys of the remote control 210 in FIG. 2 to indicate favored and disfavored programs respectively. After that, some persistent highlighting as indicated at 425 could be used to indicate that a program had been visited and identified as favored or disfavored. The selections could be grouped under classifications 430 to facilitate recognition by the user.

Figure 11:
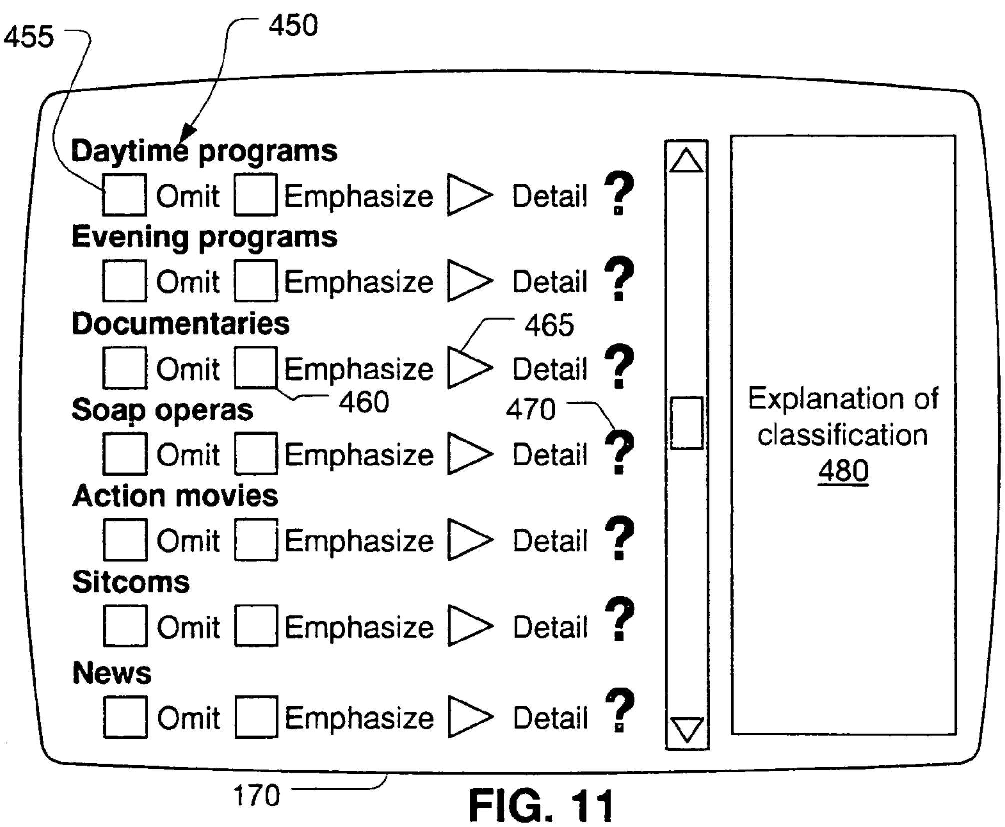
FIG. 11 illustrates a setup UI to allow the user to omit or emphasize selected categories of content for use with the UI of FIG. 10 or others.

Referring to FIG. 11, a setup page could be employed before the simulated interaction display and input of FIG. 10 (together, synthetic user interaction UI 65 or 365) to make the interaction with the UI more efficient. In this UI, for each of various classifications of content, the user can indicate whether the user tends to use a great deal of such content or essentially none of such content. For example, by checking the check box 455, the user could indicate that the user does not want to use any Daytime programs. The window 480 can be provided to give a fuller definition of a currently selected classification by clicking on a HELP token 470. To refine the classification, the user can obtain narrower classifications to enable the user to omit certain kinds of material and emphasize other kinds of material. For example, if the user wants to use documentaries, but knows that a general class of documentaries are not useful and that another is, he can select token 465 to provide a narrower layer of classifications such as nature, historical, science, home improvement, etc.

Figure 12:
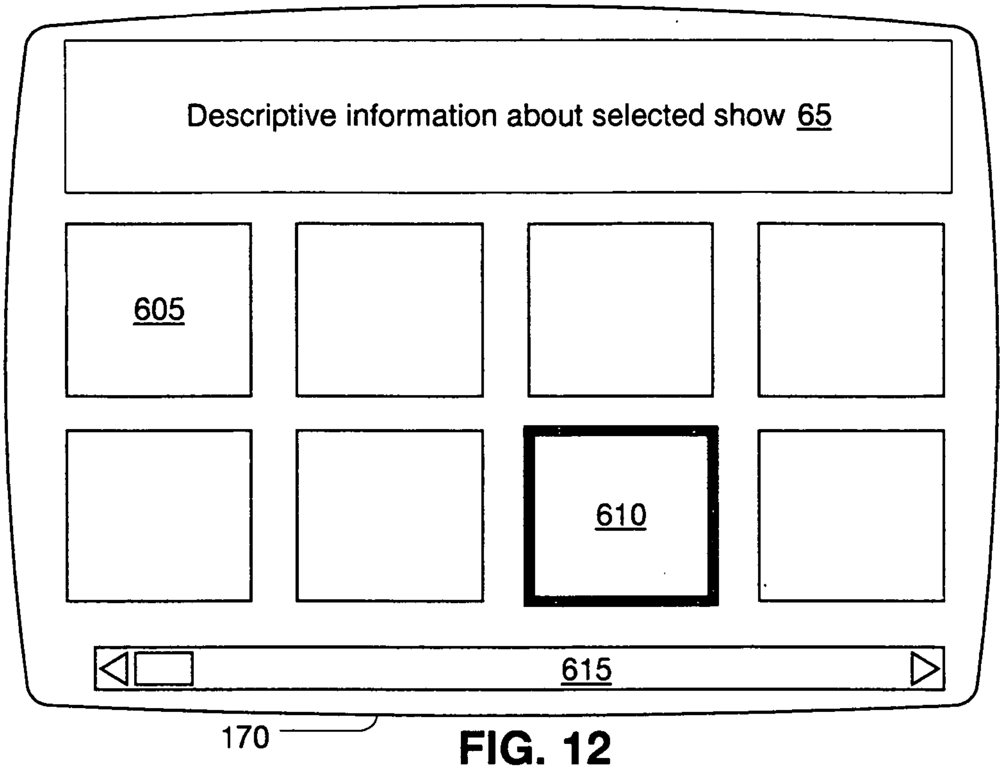
FIG. 12 illustrates a variation on a selection screen for making preference selections by viewing stored thumbnail clips of content tentatively selected as favored.

Referring to FIG. 12, a video-thumbnail display has a number of video thumbnails 605 that can be shown simultaneously as moving video, as static frame grabs. A currently selected thumbnail 610 may be the only one that actually plays while the others 605 remain as still frames. A scroll bar 615 permits the user to display more than the number of thumbnails that can conveniently fit on the screen. Descriptive information on the currently selected program can be displayed in the window 65. The user can select a subset of the possible list of programs using the interface of FIG. 11 or something similar. Then the user can further select a set of programs to view. The thumbnails would be shown and the user could select a thumbnail to hear the audio. Then, by pressing an activation key, the selected thumbnail 610 could be expanded for fullscreen viewing.

Figure 13:
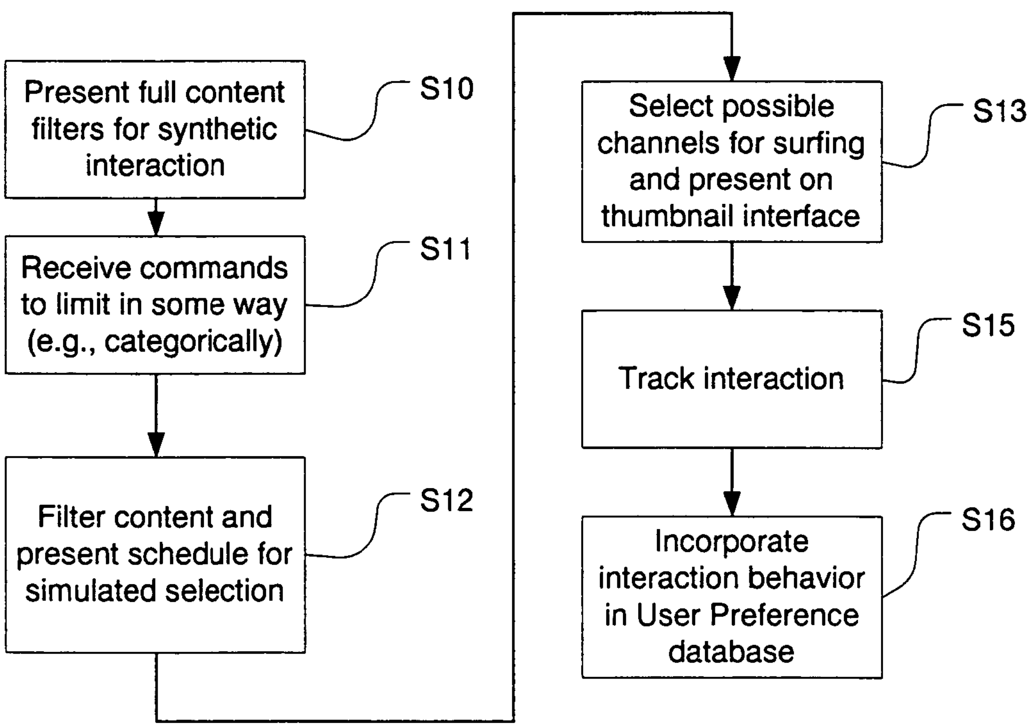
FIG. 13 is a flow diagram indicating the steps employed to obtain and store preference data according to various embodiments of the invention.
Figure 14:
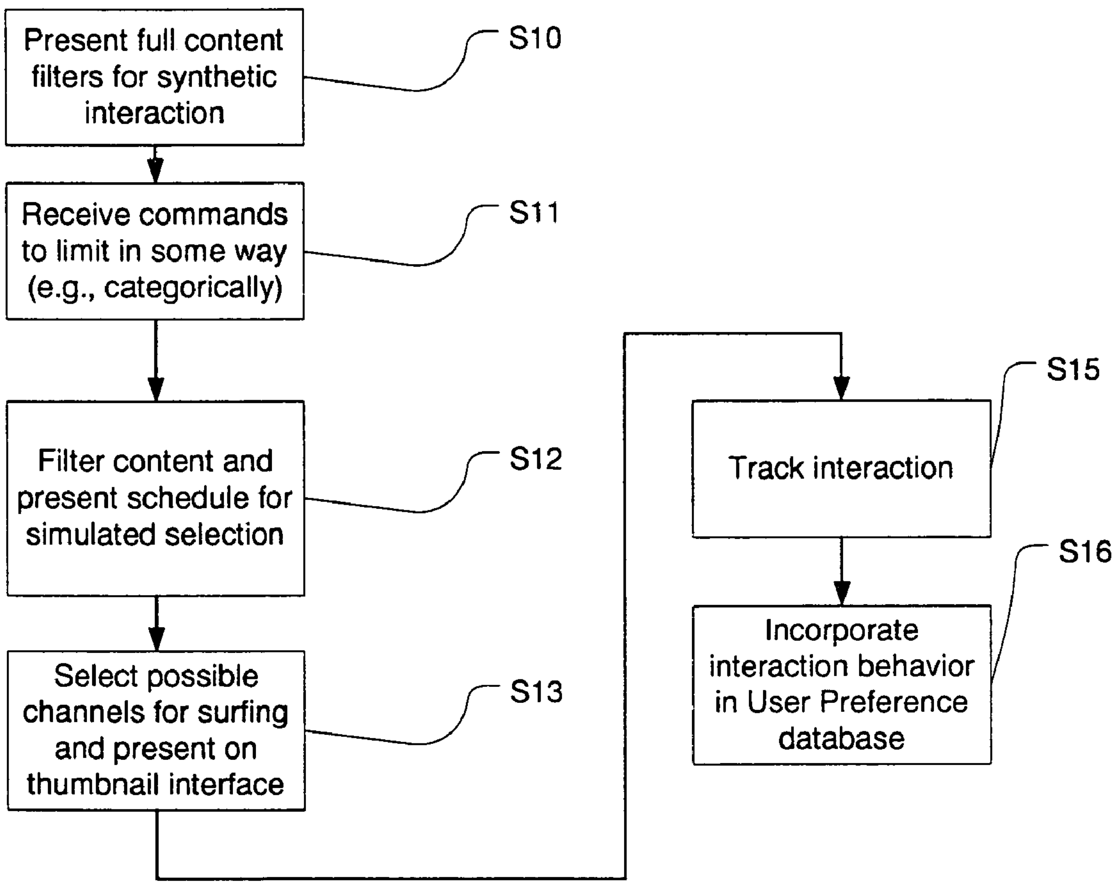
FIG. 14 is a flow diagram indicating steps employed to obtain and store preference data according to embodiments that permit a surfing-like style of interaction.

The programs selecting can be stored clips from previous broadcasts. For example, current systems such as Philips® TiVO® store video content digitally on a hard drive. A large sample of material could be stored and subsequently used to create a selection set. One example of a use of this interface is shown in FIG. 13. An interface such as shown in FIG. 11 is presented in step S11 and commands received to cull all the available programming is received in step S11. The list of remaining programs after applying the filters received in step S11 is presented in step S12 through an interface, for example, that of FIG. 10. Then, in step S13, some of these programs are selected for more detailed review and presented in the interface of FIG. 12. The interaction of the user with the interface of FIG. 12 is then monitored in step S15 and data derived from the interaction is used to modify the preference data in step S16. The interaction data can be recorded and filtered in any of a variety of ways. For example, the amount of time spent watching each selected video or the number of times the user returned to it may be used to increase a score for the programs corresponding to the video clips.

Whether the user interaction data 42 is analyzed and/or reduced in some fashion by element 55 before being incorporated in the preference database 50 depends on design considerations and the machine-learning method being used. Examples of machine-learning methods that can be used with the invention include: decision-tree, neural network, rule-induction, nearest neighbor, and genetic algorithms.

The rendering of the selection input UI 25 can be modified according to the preference engine 20 in many ways, including combinations of filtering out low-score choices and highlighting high-score choices. For example low-score channels can be filtered out altogether (e.g., only soaps and nature documentaries score low) but all other content can be displayed with highlighting used to indicate high-score subject matter.

Note that the above functionality can be achieved in the hardware environment described above with reference to FIGS. 1–4 and any of its variants as well as variants not described in this specification. The particulars are not important because the functionality can be achieved in many ways. So, for example, the preference data used by the preference engine may be stored on a piece of portable media carried by the user, which media is polled by an RF link. In this case, the media could be charged with data in a completely different environment and the preference data copied to the local EPG system via some other means such as disk, network, etc. The interconnections between components could be made via a home network such as Firewire, a spread-spectrum RF network, or any other suitable system. The components could be embedded in a television unit, combined in an Internet terminal, or provided at an offsite server. In fact, the invention is suitable for a video on-demand service with only a simple cable television located at the user's location, with all other elements implemented offsite in a server or servers serving many users. The invention is usable with static Internet content such as files, videos, web pages, database content, as well as dynamic content such as chat rooms, video forums (e.g., Netmeeting®, CUSeeMe®), and Internet broadcasts such as news programs. In the case of static content, the static content is selected as favored, and the example of a specific piece of content is used as a basis for generalization. So if a user selects a particular web site or page, the preference expressed by that "vote" will be extended to other web sites that are deemed similar, similarity being determined in ways that are similar to devices employed by search engines. In the case of dynamic content, the selections would relate to categories of content. For example, a particular chat room or video forum may only be distinguished by some category rather than by the exact content. The latter situation is similar to the way weekly programs like business news, sitcoms, weather reports, etc. are identified.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A media control system, comprising:

a computer connected to a data source to receive periodic updates of schedule data relating to available media content deliverable through a channel;

said computer being connected to control a delivery of selected media content through said channel to a media output device;

said computer being connected to a preference data store storing preference data indicating media content preferred by a user;

said computer being connected to a user interface with a display and an input device;

said computer being programmed to select a subset of said available media content responsively to said preference data;

said computer being further programmed to display first identifiers corresponding to said subset and accept first input indicating a one of said first identifiers to be used currently or in the future and to control a delivery of media content responsively to said first input;

said computer being further programmed to display second identifiers corresponding to said schedule data and schedule data relating to media content not currently available for display and not scheduled to be available for display and to accept second input indicating multiple ones of said second identifiers indicating preferences and to store data responsive to said second input in said preference store without controlling a delivery of media content responsively thereto.

2. A system as in claim 1, wherein said computer is further programmed to store data responsive to said first input in said preference store.

3. A system as in claim 1, wherein said multiple ones are displayed simultaneously on said display.

4. A system as in claim 1, wherein said computer is further programmed to display a list of categories of media content and to accept input indicating ones of said categories to exclude from said second identifiers, and to exclude from said second identifiers accordingly.

5. A system as in claim 1, wherein said second identifiers include video clips.

6. A system as in claim 1, wherein said second identifiers include narrative descriptions.

7. A media control system, comprising:

a computer connected to a data source to receive periodic updates of schedule data relating to available media content deliverable through a channel;

said computer being connected to control a delivery of selected media content through said channel to a media output device;

said computer being connected to a preference data store storing preference data indicating media content preferred by a user;

said computer being connected to a user interface with a display and an input device;

said computer being programmed to select a subset of said available media content responsively to said preference data;

said computer being further programmed to display first identifiers corresponding to said subset and accept first input indicating a one of said first identifiers to be used currently or in the future and to control a delivery of media content responsively to said first input;

said computer being further programmed to display second identifiers corresponding to said schedule data and schedule data relating to media content not currently available for display and not scheduled to be available for display and to accept second input indicating at least one of said second identifiers indicating a preference and to store data responsive to said second input in said preference store, said second identifiers being derived from said schedule data and filtered such that said second identifiers include substantially no redundant entries, redundant entries being entries that are characterized by content that is identical according to at least one criterion other than a time of availability for use.

8. A system as in claim 7, wherein said computer is further programmed to display a list of categories of media content and to accept input indicating ones of said categories to exclude from said second identifiers, and to exclude from said second identifiers accordingly.

9. A system as in claim 7, wherein said computer is programmed to store said data responsive to said second input without controlling a delivery of media content responsively thereto.

10. A system as in claim 7, wherein said second identifiers include video clips.

11. A system as in claim 7, wherein said second identifiers include narrative descriptions.

12. A device for adding preference data to an EPG system having a preference database with preference data derived, at least in part, from program selections of a user, comprising:

a controller with a program database containing program identifiers identifying programs, at least some of whose content is not currently available for display and not scheduled to be available for display;

said controller being programmed to generate a user-interface element that displays displayed identifiers including at least a subset of said stored program identifiers and accepts user input indicating multiple selections from among said displayed identifiers, said subset including at least one identifying content that is not available for display; and a data control element that stores data responsive to said multiple selections in said preference database.

13. A device as in claim 12, wherein said user input indicating multiple selections indicates more than one selection from a single instance of displaying through said user-interface, whereby said user is able to select multiple identifiers without changing a display of said user-interface.

14. A device as in claim 12, wherein said EPG system controls a media transmission channel responsively to said preference data stored in said preference database.

15. A device as in claim 12, wherein said controller is programmed to eliminate redundant program identifiers, where said respective programs identified by said redundant program identifiers are distinguishable only by a time of broadcast.

16. A device as in claim 12, wherein said controller is further programmed such that said multiple selections indicate specific preferred uses of program material including at least one of: recording, viewing, and preventing an ability to view.

17. A media control device, comprising:

a controller connected to at least one data store holding at least preference data and media content identification data, a first subset of said identification data identifying media content available through a communications channel and a second subset of said identification data identifying media content not currently available for display and not scheduled to be available for display through said communications channel;

said controller being connectable to said communications channel to control delivery of said media content through said communications channel;

a user interface including a display and an input device;

said controller being programmed to select a first portion of said first subset of said identification data responsively to said preference data, display said first portion of said first subset of said identification data, and accept a command through said input device to use first media content from said first portion of said first subset of said identification data;

said controller being further programmed to control said communications channel responsively to said command to use;

said controller being further programmed to display a second portion of said identification data and accept commands through said input device to select second media content from said second portion of identification data without using said second media content; and said controller being programmed to modify said preference data responsively to both said commands to select and said command to use.

18. A device as in claim 17, wherein said controller is programmed such that said first portion of said first subset of said identification data and said second portion of said identification data are each displayed as lists of identifiers and the identifiers used in the two lists are identical where they pertain to the same media content.

19. A device as in claim 17, wherein said first portion of said first subset of said identification data has multiple identifiers identifying a same content and said second portion of said identification data has only single identifiers identifying said same content.

20. A device as in claim 17, wherein said controller is programmed to accept commands to limit said second portion identification data and to limit said second portion of identification data accordingly.

21. A device as in claim 20, wherein:

said controller is programmed to display predefined classes of media content;

said commands to limit include a command to emphasize representation in said second portion of identification data of identifiers corresponding to at least one of said predefined classes of media content.

22. A device as in claim 21, wherein said commands to limit including a command to omit representation in said second portion of identification data identifiers corresponding to at least one of said predefined classes of media content.

23. A device as in claim 20, wherein:

said controller is programmed to display predefined classes of media content;

said commands to limit include a command to omit representation in said second portion of identification data identifiers corresponding to at least one of said predefined classes of media content.

24. A method of updating a preference database for an electronic program guide, comprising the steps of:

generating a first list of programs currently available for viewing, said step of generating a first list including the step of permitting redundant entries when said entries are distinguishable only by a time of broadcast;

at a time of viewing, displaying said first list of programs, accepting commands to select at least one program from said first list, and controlling a media output device to display said at least one program;

generating a second list of programs that are not currently available for display and not scheduled to be available for display and programs that are scheduled to be available currently and in the future, said step of generating a second list including the step of excluding redundant entries when said redundant entries are distinguishable only by time of broadcast;

at a time of programming, displaying said second list of programs and accepting commands to select multiple programs from said second list and storing said multiple selections; and modifying said preference database responsively to said multiple selections.

25. A method as in claim 24, wherein said step of generating a second list includes displaying a list of program categories, accepting commands referencing said program categories, and excluding programs from said second list responsively to said commands referencing said program categories.

26. A method of updating a preference database used by an electronic program guide to modify listings of currently available programming, comprising the steps of:

displaying a list of program categories;

accepting commands referencing said program categories;

generating a list of programs that are not currently available for display and not scheduled to be available for display and programs that are scheduled to be available currently and in the future;

excluding from said list redundant entries when said redundant entries are distinguishable only by time of broadcast;

modifying said list responsively to said commands referencing said program categories;

at a time of programming, displaying said second list of programs and accepting commands to select multiple programs from said second list and storing said multiple selections; and modifying said preference database responsively to said multiple selections without controlling an output of any of said programs identified in said multiple selections.

27. A method as in claim 26, wherein:

said step of accepting commands referencing said program categories includes accepting a command to emphasize programs in a selected category; and said step of modifying said list includes increasing representation in said list of programs in said selected category.

28. A computer user interface for generating media content selections to serve as examples of desired selections for use in generating and refining user-preference profiles stored in a database, the computer user-interface comprising:

a controller with a display and an input connected to receive program selection identifiers;

said controller being programmed to:

receive media content data from a data source;

display, on said display, content identifiers of said media content responsive to said media content, wherein at least one of said identifiers identifies media content that is not currently available for display and not scheduled to be available for display;

at a time of inputting, receive inputs from a user indicating ones of said identifiers corresponding to content the user prefers to use, said inputs not necessarily indicating content said user will use, but content to serve as an example for purposes of building a user-preference profile; and transmit said inputs to said database.

29. An interface as in claim 28, wherein said content identifiers displayed on said display are further responsive to a preference profile representative of the preferences of a plurality of users.

30. A system as in claim 1, wherein said preference data further indicates media content preferred by a plurality of other users.

31. A system as in claim 7, wherein said preference data further indicates media content preferred by a plurality of other users.

* * * * *